March 15, 1932.　　　　R. PFLÜGER　　　　1,849,202

GREAT CIRCLE RULING DEVICE

Filed March 24, 1930

Inventor

R. Pflüger,

By Foster v Cadier

Attorney

Patented Mar. 15, 1932

1,849,202

UNITED STATES PATENT OFFICE

RUDOLF PFLÜGER, OF HAMBURG, GERMANY

GREAT CIRCLE RULING DEVICE

Application filed March 24, 1930, Serial No. 438,511, and in Germany March 3, 1929.

The invention relates to an instrument for drawing with mathematical accuracy great circles and parallel circles on spherical drawing surfaces. The instrument is suitable for checking all calculations in spherical trigonometry and its applications. Particularly does it enable the graphic determination of the position of a ship to be made for navigation purposes. Further the instrument is particularly suitable for demonstration purposes in mathematical instruction.

Spherical and hemi-spherical drawing surfaces are already well known, but means have been lacking to enable the great and parallel circles, necessary for mathematical calculations, to be drawn with the essential accuracy. For this purpose it has already been proposed, it is true, to use a device consisting of mutually rotatable bands of three quarters the circumefence of the circle, this device being clamped to the spherical surface. The mathematically great circles necessary for measuring purposes may however not be drawn by this method as the fixing of the hoop to the sphere is not without imperfection. In such an instrument, when the bands form an acute angle to each other, the spherical curvature decreasing only slowly along the bearing surfaces of the rule (only at 18° lateral to the great circle is there a decrease of 5%) offers no degree of certainty of an effective great circle being drawn, owing to the inevitable springing and lateral bending. The fixing of a plane must be done positively and this can be done with mathematical accuracy only through three points. If a plane so fixed gives as a section with a sphere a great circle also, the plane must moreover contain the centre point of the sphere as a fourth point.

With the instrument forming the subject of the invention, it is possible to draw the great circle with such mathematical accuracy, as is technically possible.

The essence of the invention will now be explained in conjunction with the accompanying drawings.

Figure 1:
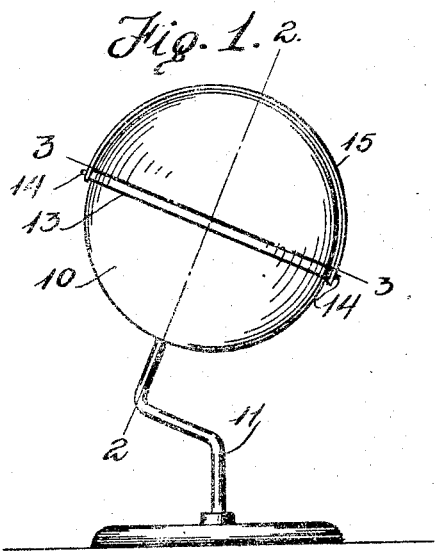
Figure 1 is a side elevation of the invention with the sphere shown on a conventional mounting.
Figure 2:
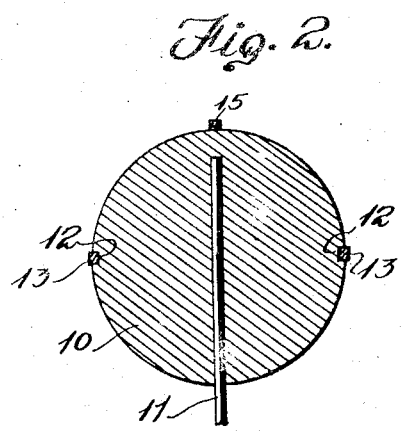
Figure 2 is a section on the line 2—2 of Figure 1.
Figure 4:
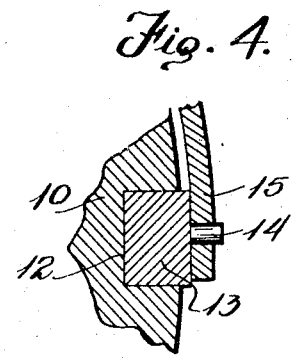
Figure 4 is an enlarged detail section of the joint between the rulers of the invention.
Figure 3:
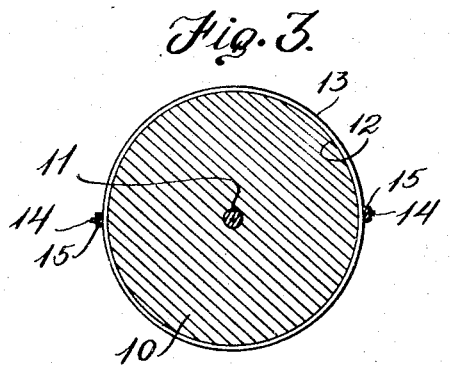
Figure 3 is a section on the line 3—3 of Figure 1.

In the embodiment of the invention here shown there is illustrated a sphere 10 supported conventionally on a stand 11. A groove 12 is formed in the sphere at the equator thereof and in this groove is slidably fitted a great circle bar 13 in the form of a ring or annulus. Opposite diametrically disposed pivots 14 on this bar 13 support a substantially semi-circular bar 15 forming the arc of a great circle.

By means of the movement of the ring 13 the pivot points 14 may be shifted to any desired positions around the equator of the sphere and the bar 15 may be adjusted to any desired angle relative to the bar 13. Thus a wide range of problems relative to spherical trigonometry may be charted on the sphere.

What is claimed, is:

1. The combination with a sphere having a great circle groove extending therearound, of a bar forming a great circle mounted on said sphere and engaging the groove to slide therein, and a substantially semi-circular bar having its ends pivoted to diametrically opposite points of the first bar.

2. The combination with a sphere having an equatorial groove, of a circular bar forming the equatorial circle of said sphere and having sliding engagement with the groove, and a great circle arc bar having its ends pivoted to diametrically opposite points of the circular bar.

In testimony whereof I affix my signature.

RUDOLF PFLÜGER.